United States Patent [19]
Barber et al.

[11] Patent Number: 6,126,245
[45] Date of Patent: Oct. 3, 2000

[54] ELECTROPNEUMATIC BRAKE VALVE WITH RELEASE AND RUNNING MODES

[75] Inventors: Wayne H. Barber, Watertown; John W. Laduc, Harrisville; Steven R. Newton; Ronald O. Newton, both of Adams, all of N.Y.

[73] Assignee: New York Air Brake Corporation, Watertown, N.Y.

[21] Appl. No.: 08/980,819

[22] Filed: Dec. 1, 1997

[51] Int. Cl.[7] .................................................. B60T 8/02
[52] U.S. Cl. ............................................. 303/3; 303/15
[58] Field of Search ........................... 303/3.15, 59, 28, 303/61, 901, 84.1

[56] References Cited

U.S. PATENT DOCUMENTS

| | | |
|---|---|---|
| 4,105,257 | 8/1978 | Engle et al. ................................ 303/74 |
| 4,586,584 | 5/1986 | Auman et al. ........................... 180/271 |
| 4,598,953 | 7/1986 | Wood et al. ............................... 303/71 |

*Primary Examiner*—Matthew C. Graham
*Attorney, Agent, or Firm*—Barnes & Thornburg

[57] ABSTRACT

An electropneumatic brake controller of the present invention including a main reservoir, pneumatic brake pipe relay and first and second restrictions connected in series with the main reservoir, the brake pipe relay and brake pipe and first electropneumatic valve connected in parallel to the second restriction. The second restriction is smaller than the first restriction. The first electropneumatic valve is responsive to an electric release signal to cut out the second restriction. When the two restrictions are in series, this is the running mode whereas when the second restriction is cut out, this is the release mode. A control unit controls the electropneumatic valves to produce an overcharge cycle in response to a release brake signal. This cycle includes overcharging the brake pipe, holding the overcharged condition for a fixed period of time and bleeding to a normal release brake pipe pressure.

27 Claims, 7 Drawing Sheets

| T1 | HANDLE MOVED TO RELEASE (NO PENALTY OR EMERGENCY BRAKE APPLICATIONS IN EFEECT) |
|----|---|
| T2 | ER PRESSURE REACHED THE PRESET OVERCHARGE PRESSURE LIMIT |
| T3 | OVERCHARGE IS HELD FOR THE PRESET OVERCHARGE TIME LIMIT |
| T4 | ER PRESSURE REACHES THE NOMINAL RELEASE PRESSURE |
| T5 | ANY BRAKE APPLICATION OCCURS |
| T6 | ANY BRAKE APPLICATION OCCURS |
| T7 | ANY BRAKE APPLICATION OCCURS |
| T8 | HANDLE MOVED TO RELEASE (NO PENALTY OR EMERGENCY BRAKE APPLICATONS IN EFFECT) |
| T9 | HANDLE MOVED TO RUN (NO PENALTY OR EMERGENCY BRAKE APPLICATIONS IN EFFECT) |

ELECTROPNEUMATIC BRAKE VALVE WITH RELEASE AND RUNNING MODES

BACKGROUND AND SUMMARY OF THE INVENTION

The present invention relates generally to locomotive brake control and more specifically to an electronically controlled locomotive brake control.

For those countries under the auspices of the American Association of Railroads ("AAR") use a 26C brake valve and a 26F control valve for the locomotive brakes. The 26C brake valve includes an automatic brake handle for controlling the train brakes and an independent brake handle for independently controlling the locomotive brakes. The 26F control valve is responsive to the brake signals to operate the locomotive brakes. The 26C brake valve has a release/charge position, service position, suppression position, handle off position and an emergency position. In the release/charge position, the brake pipe is charged from a main reservoir. This not only charges the brake pipe, but causes release by increasing the pressure in the brake pipe. For very long trains, initially, the front end must be overcharged to assure release in the other end of the train. In AAR trains, emergency vent valves are distributed throughout the train to sense emergency conditions, namely an emergency drop in pressure in the brake pipe, to initiate emergency braking throughout the train. Also, the brake control valve in each of the cars can accelerate the release by locally applying pressure from a chamber in the valve to the brake pipe. This accelerates the transmittal of the release throughout the brake pipe. This local charging of the brake pipe for quick release is not at a sufficiently high rate as to prevent a break-in-two emergency brake application.

In some non-AAR countries or UIC countries, the brake control valves in the cars do not have the capability of locally dumping pressure into the brake pipe to locally increase the brake pipe pressure and therefore accelerate release. Thus, the locomotive brake controller has two positions for release or charging. It has a release position and a running position. In the release position, a substantially greater flow of pressure is provided to the brake pipe to give it a head start in charging back to the desired release brake pipe pressure. This is followed by placing the brake controller into a running position to allow a slower charging of the brake pipe to continue charging and release. The second rate will allow a break-in-two emergency brake application while the first rate will not.

The automatic brake control valve known as an H-6-L has a release, running, holding, lap, service and emergency positions. In the release position, a large and direct passage from the main reservoir to the brake pipe is provided. This quickly begins the charging of the brake pipe. To ensure release, the brake pipe is initially overcharged by the operator. If the handle is allowed to remain in this position for any length of time, the brake system would be charged to the main reservoir pressure. To avoid this, the handle is placed in the running position. A small port discharges main reservoir air to the atmosphere in the release position as sufficient noise to attract attention to the handle being in release.

In the running position, a large passage at the brake valve connects the feed valve pipe to the brake pipe. Thus, the brake pipe is charged under the feed valve control and cannot attain a pressure above that for which the feed valve is adjusted. The equalization reservoir charges uniformly with the brake pipe, keeping the pressure on the two sides of the equalization piston balanced. The two separate restrictions for the release position and the running position are basically mechanically in parallel to the brake pipe. To adjust these two orifices, the brake control valve must be disassembled and reconstructed.

The conversion of the 26C and the 26F to electronic or electropneumatic has progressed in AAR. A typical example is the CCBI and CCBII available from the New York Air Brake Corporation. The handle positions of the brake valve are electronically determined and used in electronic controls of the electropneumatic and pneumatic valves to duplicate the functions of the 26C and the 26F. There is a need for similar conversion in other countries that are not AAR, and especially in countries which include trains with older valve structures at the cars. Thus, there is a need to duplicate release, running and overcharging using electronic and electropneumatic controls of the release, running and brake pipe control at the electropneumatic brake controller.

The electropneumatic brake controller of the present invention includes a main reservoir, a pneumatic brake pipe relay first and second restrictions connected in series with the main reservoir, the brake pipe relay and brake pipe and a first electropneumatic valve connected in parallel to the second restriction. The second restriction is smaller than the first restriction. The first electropneumatic valve is responsive to an electric release signal to cut out the second restriction. When the two restrictions are in series, this is the running mode whereas when the second restriction is cut out, this is the release mode. The low running charging rate on the brake pipe allows the brake valves on the individual car to operate as if the original brake control valves were being used.

The controller includes manifolds to which is mounted the brake pipe relay, the first and second restrictions and the first electrical pneumatic valve. At least one, if not both restrictions are replaceable on the manifold. This allows replacement of the restrictions without mechanical reconstruction of the brake valve or the brake controller. The combination of the series connected first and second restriction has a flow rate sufficiently low to allow a break-in-two emergency brake application.

The first electropneumatic valve has an input connected to exhaust and a second input connected to a source of pressure. A pilot valve having a first input and output connecting the pilot valve in parallel to the second restriction and also includes a pilot input connected to the output of the first electropneumatic valve. The first pneumatic valve is biased to connect its output to exhaust when not activated and the pilot valve is biased to disconnect its first input and output when activated. Thus, for non-activation or failure of the electronics, the first and second restrictions are in series and thus, are always in the running mode with no ability to go to the release mode.

An equalization reservoir and a second electropneumatic valve controlling the pressure in the equalization reservoir are also provided. The brake pipe relay is responsive to the pressure difference between the brake pipe and the equalization reservoir. The second electropneumatic valve charges the equalization reservoir from the main reservoir during release. An operator control provides electric brake signals and a control unit generates the electric release signal in response to a brake control signal from the operator control.

The control unit also produces an overcharge condition in the brake pipe. The control unit through control of equalization reservoir and the restriction overcharges the brake pipe to a predetermined overcharged value. Once initiated, the control unit completes the overcharge in response to release or run brake control signals. The overcharge cycle is terminated in response to a service brake control signal. Once the overcharge value has been reached, the control unit maintains the overcharge value for a fixed period of time. After the fixed period of time, the control unit bleeds the brake pipe using the equalization reservoir control at a bleeding rate to a release pressure value. The control unit controls the brake pipe reduction in response to the service brake control signal from the brake pipe pressure at the charge and termination.

The overcharging cycle includes charging the brake pipe at a first rate to an overcharged value, holding the brake pipe at the overcharge value fixed period of time, and finally after the fixed period of time, bleeding the brake pipe at a bleeding rate to release pressure value. The charging, holding and bleeding cycle is continued once initiated in response to the release brake control signal. This cycle is terminated in response to service brake control signal. The reduction of the brake pipe pressure in response to a service brake control signal is from the brake pipe pressure at cycle termination.

Other objects, advantages and novel features of the present invention will become apparent from the following detailed description of the invention when considered in conjunction with the accompanying drawings.

DETAILED DESCRIPTION OF THE PREFERRED EMBODIMENT

Figure 1A:
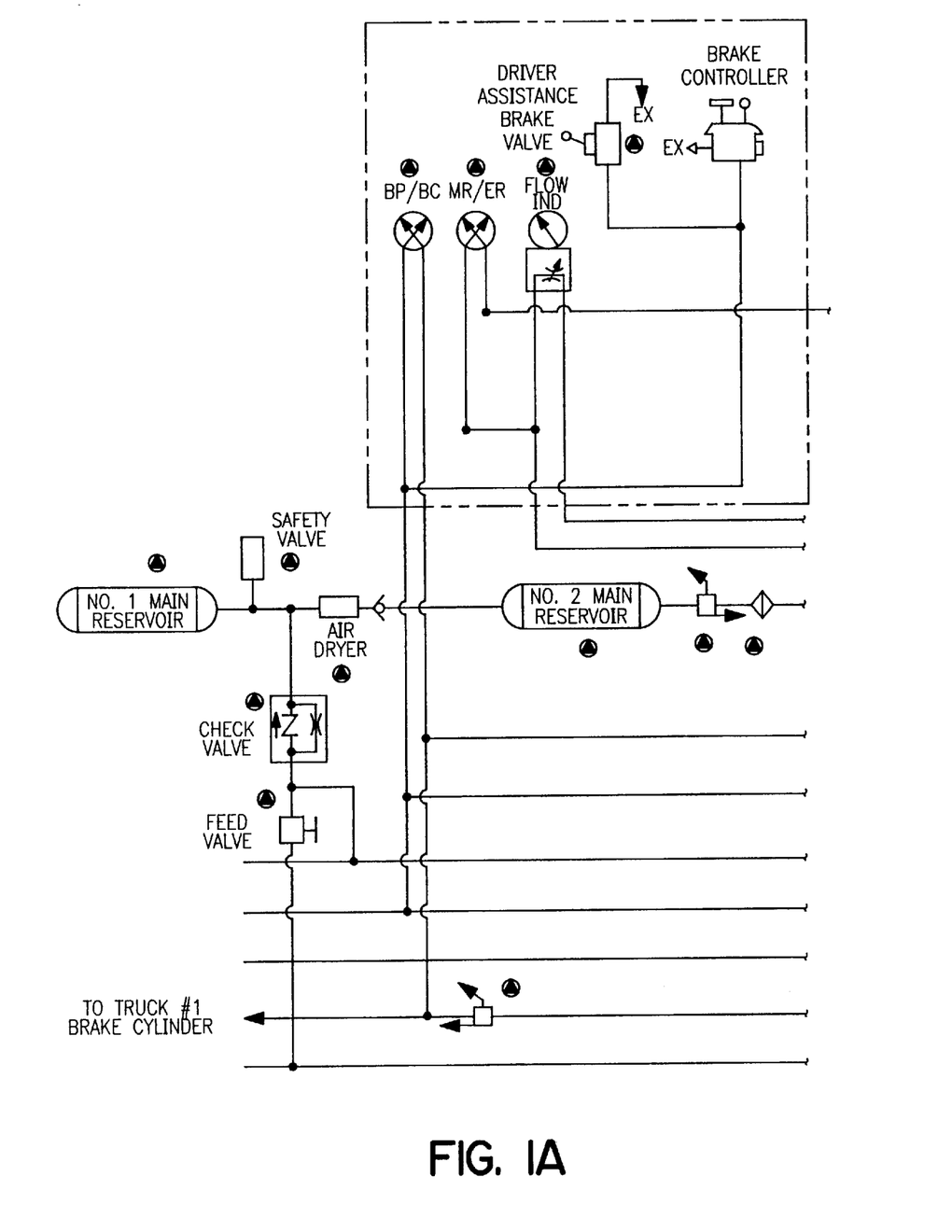
FIGS. 1A–1C is a block diagram of a locomotive brake control system according the present invention.
Figure 1B:
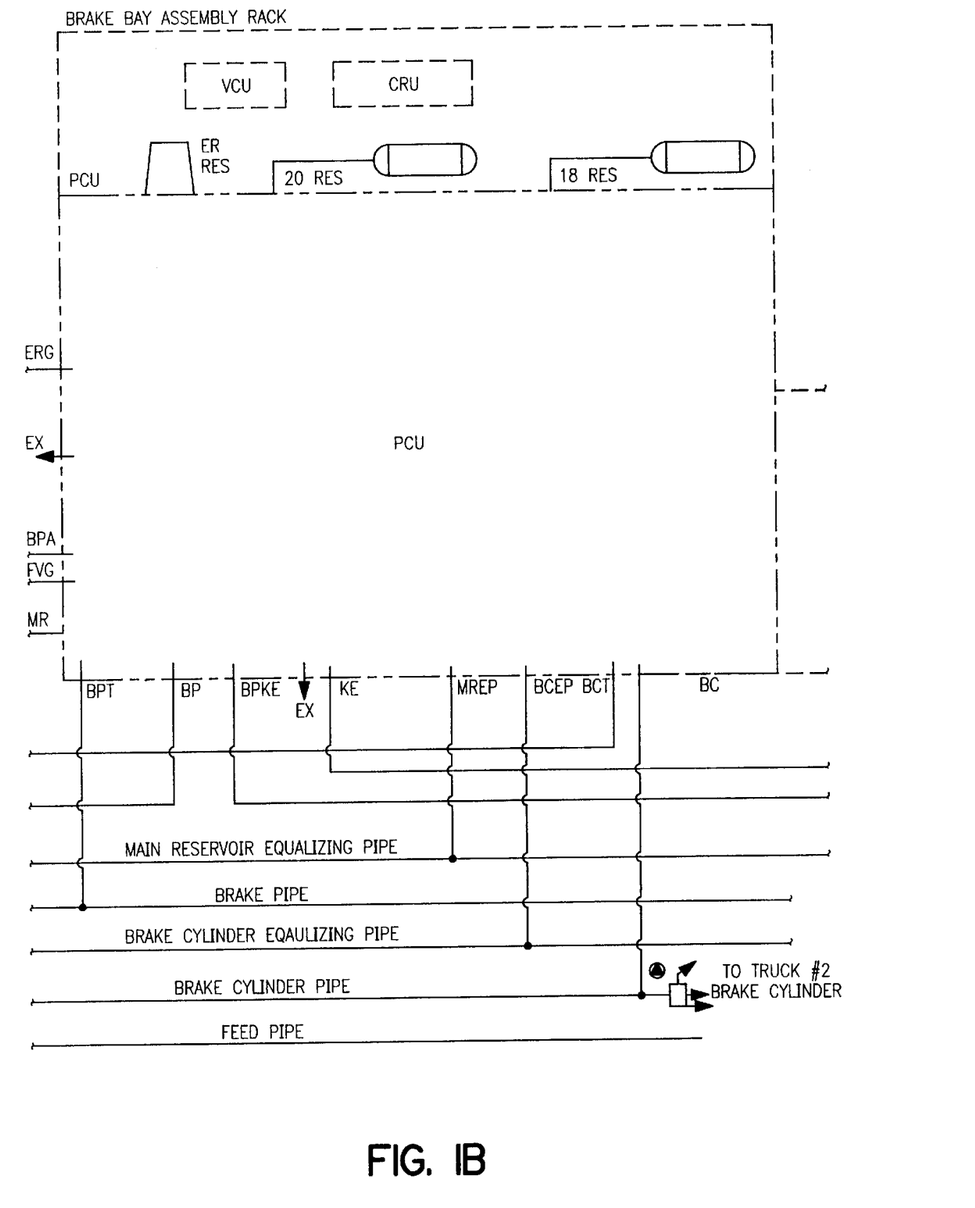
Figure 1C:
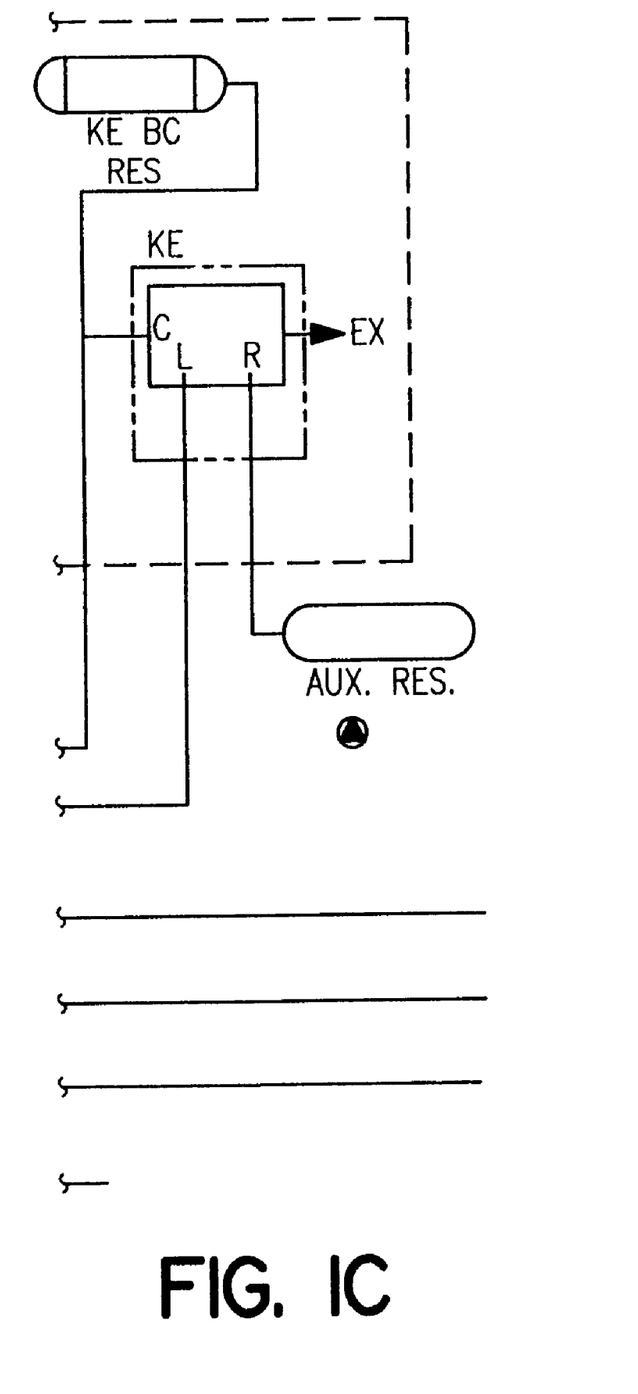

An overall view of the locomotive brake system, in which the present invention can be used, is illustrated in FIG. 1. This is merely one example of a system in which the present invention, providing both an electrically controlled release and running mode can be used. The locomotives within a train are interconnected by a main reservoir equalizing pipe, brake pipe, brake cylinder equalizing pipe and feed pipe. The feed pipe is connected to a compressor which feeds all of the main reservoirs on each of the cars through a feed valve. The brake cylinder equalization pipe may also be known as the independent application and release pipe or the 20 pipe. The brake pipe runs throughout the train and each of the cars respond to the pneumatic pressure in the brake pipe to either apply or release their brakes.

The feed pipe is connected through a feed valve and a check valve to a number 1 and a number 2 main reservoir. A safety valve and air dryer are also provided. The second main reservoir is connected through the air dryer and a flow check. The number 2 main reservoir is connected by a regulating valve and a filter to the pneumatic control unit PCU in the brake bay assembly rack. The control stand includes a brake controller and a driver assistant brake valve. The brake controller includes an automatic brake handle and independent brake handle. Both the brake controller and driver assistant brake valve are pneumatically connected to the brake pipe to exhaust the brake pipe and initiate an emergency. The brake controller is an operator control providing electric brake control signals to a control unit shown as Computer Relay Unit CRU. Power is supplied to the brake system by the Voltage Conditioning Unit VCU.

The operator control stand also includes gauges which show the brake pipe pressure BP, brake cylinder pressure BC, main reservoir pressure MR, equalization reservoir pressure ER, and a flow indicator for the main reservoir line out of the number 2 main reservoir. These gauges are connected to appropriate ports on the pneumatic control unit PCU, or connected directly to the brake pipe and brake cylinder pipe for example, the equalization reservoir gauge is connected to port ERG, the main reservoir gauge is connected to port FVG and the flow meter is connected across ports FVG and BPA.

It should also be noted that the brake cylinder pipe is connected to brake cylinder transducer port BCT of the pneumatic control unit PCU. The pneumatic control unit is connected to the brake pipe through the brake pipe port BP and has a brake pipe transducer connected at port BPT. The main reservoir equalization pipe is connected at port MREP, the brake cylinder equalization pipe is connected at port BCEP and the brake cylinder pipe is connected at port BC. Also connected on the brake bay assembly rack and connected to appropriate ports of the pneumatic control unit PCU are an equalization reservoir ER, a 20 reservoir and a 16 reservoir Also mounted on the brake bay assembly rack is a distributor valve KE with its distributor brake cylinder reservoir KEBC and auxiliary reservoir AUX. The distributor valve KE is connected to the pneumatic control unit PCU at ports KE and BPKE.

Figure 2A:
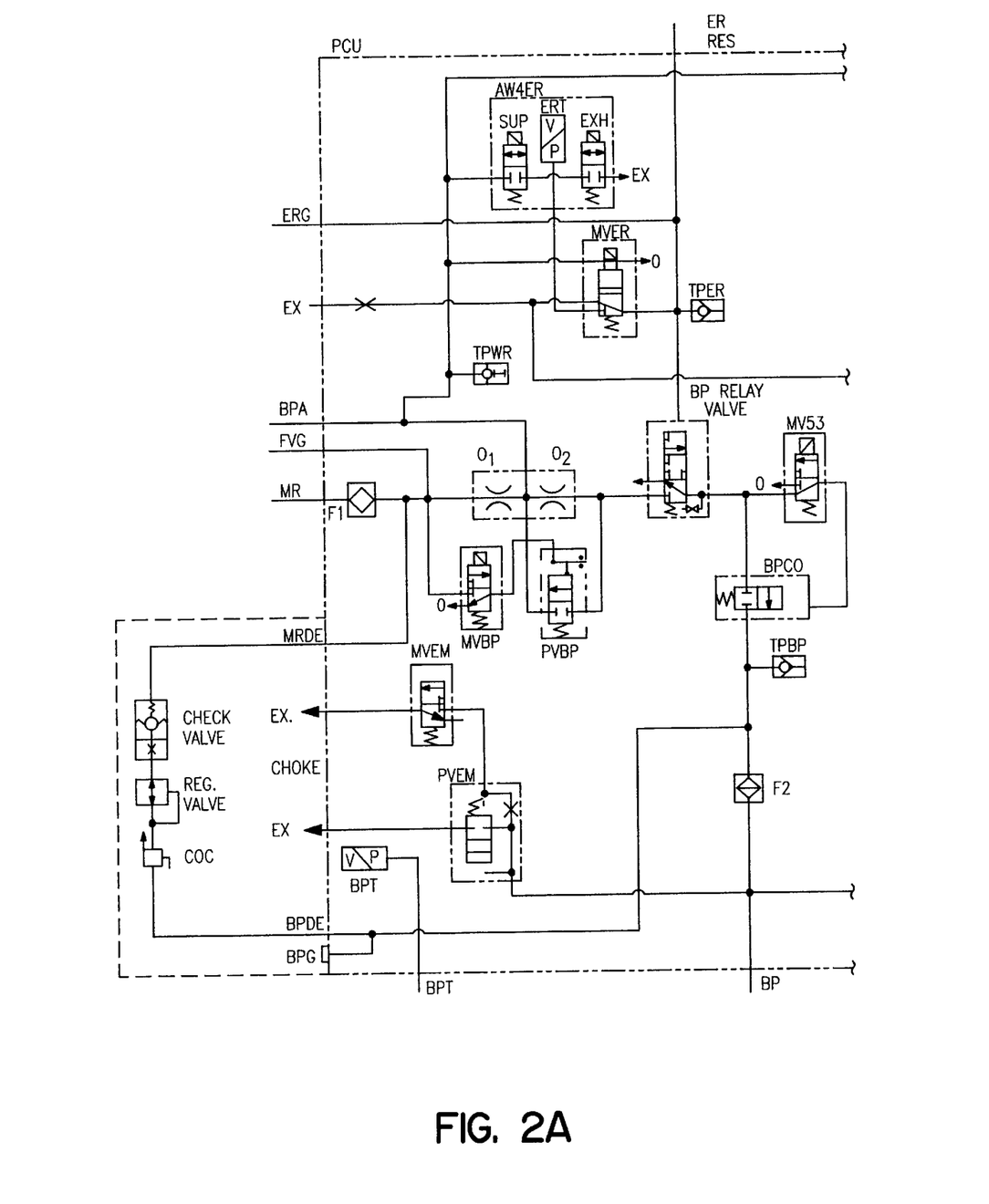
FIGS. 2A–2C is a schematic of the pneumatic control unit incorporating the principles of the present invention.
Figure 2B:
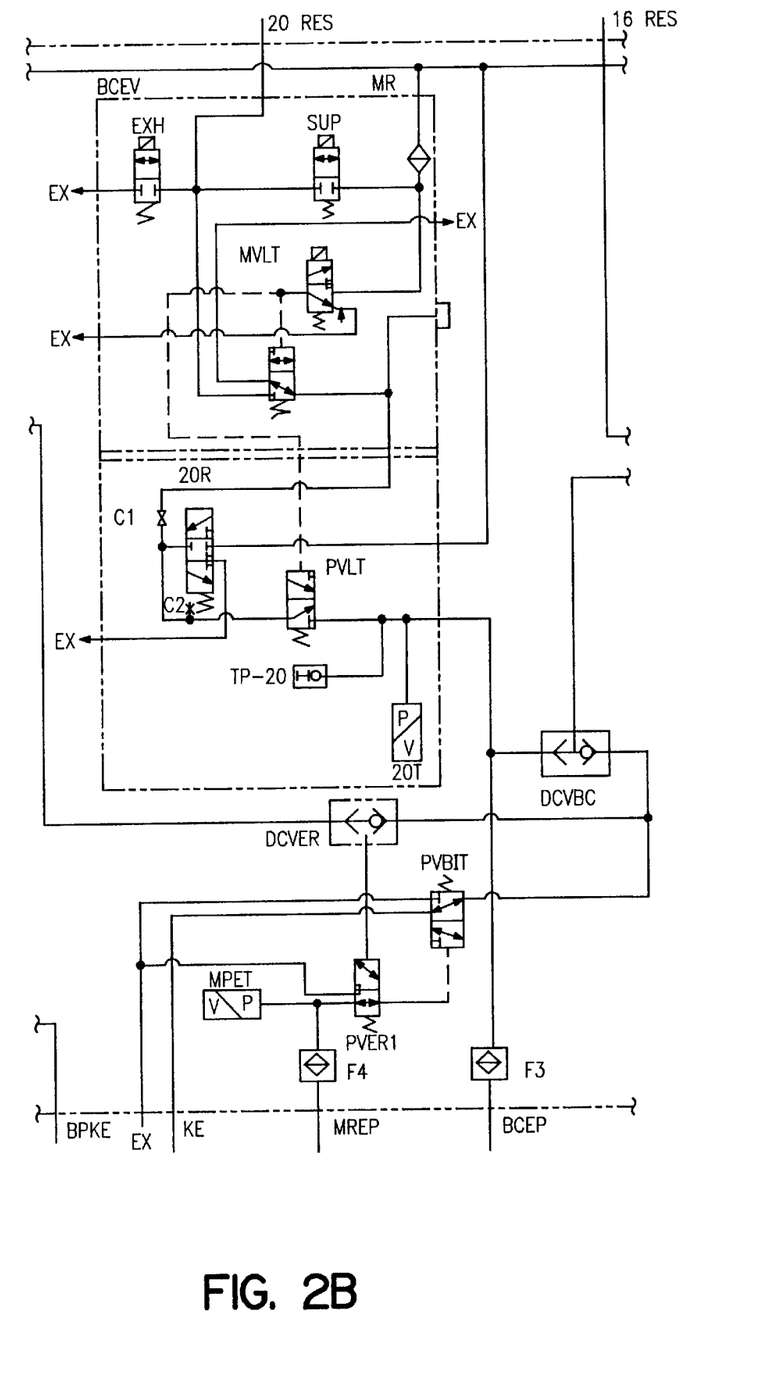
Figure 2C:
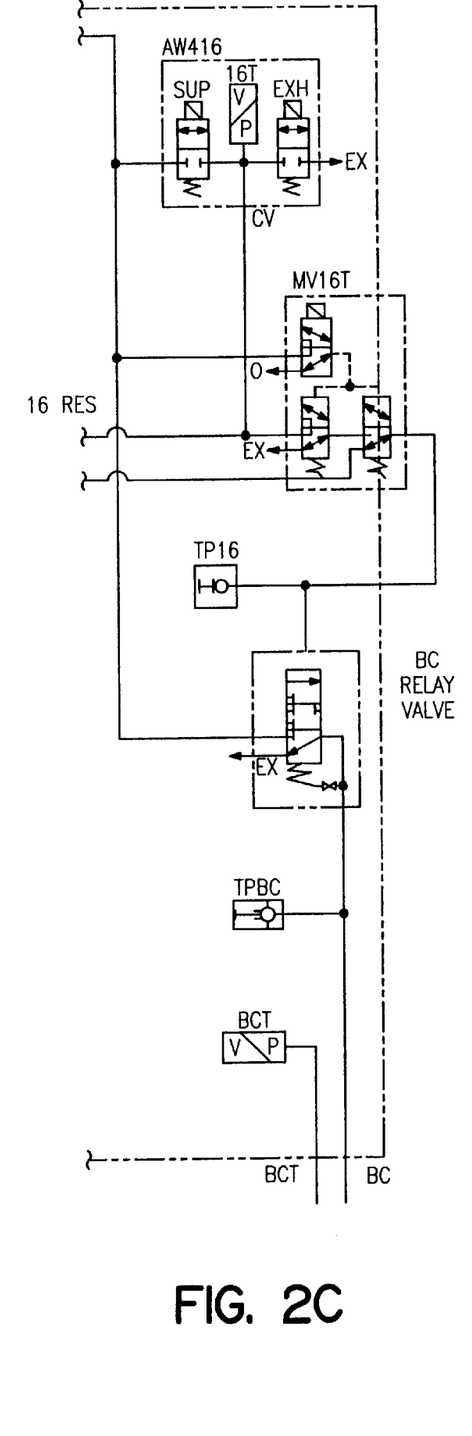

A pneumatic control unit PCU incorporating the principles of the present invention is illustrated in FIG. 2. The dotted line signifies a manifold to which the elements are mounted and fluidly interconnected. The main reservoir port MR is connected through filter F1 to a pair of serial connected orifices 01 and 02. The output of orifice 02 is connected as an input to the brake pipe relay valve, BP relay valve which is a three position valve. The output of the brake pipe relay valve is connected as an input to the brake pipe cutoff pilot magnetic valve MV53 and to the brake pipe cutoff pneumatic valve BPCO. The output of the brake pipe cutoff valve BPCO is connected through filter F2 to brake pipe port BP. The brake pipe test port BPTP is also connected at the output of the brake pipe cutoff valve BPCO.

An electropneumatic valve or bypass magnetic valve MVBP has an input connected to the main reservoir MR and an output connected as a pilot input to a bypass pneumatic valve PVBP. An input of the bypass pneumatic valve PVBP is connected to one side of the second orifice 02 and its output is connected to the other side of the orifice 02. Thus, the valve PVBP is connected in parallel to the second orifice 02 and is responsive to the pilot signal to bypass or cut out the second orifice 02. The bypass magnetic valve MVBP and the bypass pneumatic valve PVBP are biased to their inactive positions.

Thus, in the deactivated position of the bypass magnetic valve MVBP, the exhaust or no signal is provided as a pilot input to the bypass pneumatic valve PVBP which disconnects its input from its output and the two orifices 01 and 02 are in series. When the bypass magnetic valve MVBP is actuated in response to an electric release signal, it connects its output to the main reservoir signal providing a pilot signal to the bypass pneumatic valve PVBP moving it to a position connecting its input and output and therefore bypassing or cutting out the second orifice 02. Thus, only the first orifice 01 is connected between the main reservoir MR and the brake pipe relay valve.

Normally, the two orifices 01 and 02 are in series providing a flow rate which is equivalent to the running charge rate. When 02 is bypassed, the orifice 01 is equivalent to the release flow rate of the prior art. Experiments have shown that the orifice 01 should have a diameter of 8 millimeters and the orifice of 02 should have diameter of 4.6 millimeters. One or both of the orifices may be removably mounted on the manifold. This allows quick and easy adjustment with reconstruction as in the prior art.

The magnetic and pneumatic bypass valves MVBP and PVBP in combination with the brake pipe relay valve charges the brake pipe at either a release rate or a running rate. The running rate of the serial combination of orifices 01 and 02 is sufficiently low to allow a break-in-two emergency brake application from separation of the train. As previously discussed, the electrical train brake control signals from the brake controller is converted into release signals by the computer relay unit CRU to control the bypass magnetic valve MVBP.

The brake pipe relay valve is responsive to the difference of the pressure in the equalization reservoir and the brake pipe. The equalization reservoir is controlled by electropneumatic AW4ER in combination with equalization reservoir default magnetic valve MVER. The equalization reservoir is charged and discharged from the main reservoir by electropneumatic AW4ER under the control of computer relay unit CRU. Test points TPMR and TPER are provided for the main reservoir and the equalization reservoir respectfully. An equalization reservoir transducer ERT is provided in the AW4ER.

The computer relay unit CRU receives brake control signals from the brake controller and pressure signals from the transducers to control all of the electropneumatic valves in the pneumatic control unit PCU. In response to a release brake control signal, it controls electropneumatic valve MVBP to bypass or cut out orifice 02 and charge the brake pipe at the higher rate. This is transition T1 from reset state S1 to overcharging state S2 in FIG. 3. The value to which the brake pipe is charged is determined via control of AW4ER by the computer relay unit CRU which controls the value of the equalization reservoir. The computer relay unit CRU through the control of the equalization reservoir maintains the brake pipe relay connected to the main reservoir to overcharge the brake pipe to a predetermined overcharged value. This is transition T2 from overcharging state S2 to holding state S3. Next, the computer relay unit CRU controls the AW4ER to slowly bleed the equalization reservoir and consequently the brake pipe, from the overcharged value to the desired release value in the brake pipe. This is transition T3 from holding state S3 to bleeding state S4. Once the desired valve is reached, the system transitions at T4 from bleeding state S4 to reset state S1.

The control AW4ER is an analog system driven by modulation control signals to affect the bleeding rate of the equalization reservoir and consequently the brake pipe. By way of example, a brake pipe release pressure is in the range of 5 bars, and an over pressure would be at a range of 5.5 bars. The charge rate of the brake pipe to the overcharge value would be, for example, 0.05 bar per second. The time period in which the brake pipe is held at the overcharge position would be, for example, 10 seconds. The slow bleed off-rate would be, for example, 0.002 bars per second. These are merely typical examples which would meet the requirements of, for example, UIC specification.

Figure 3:
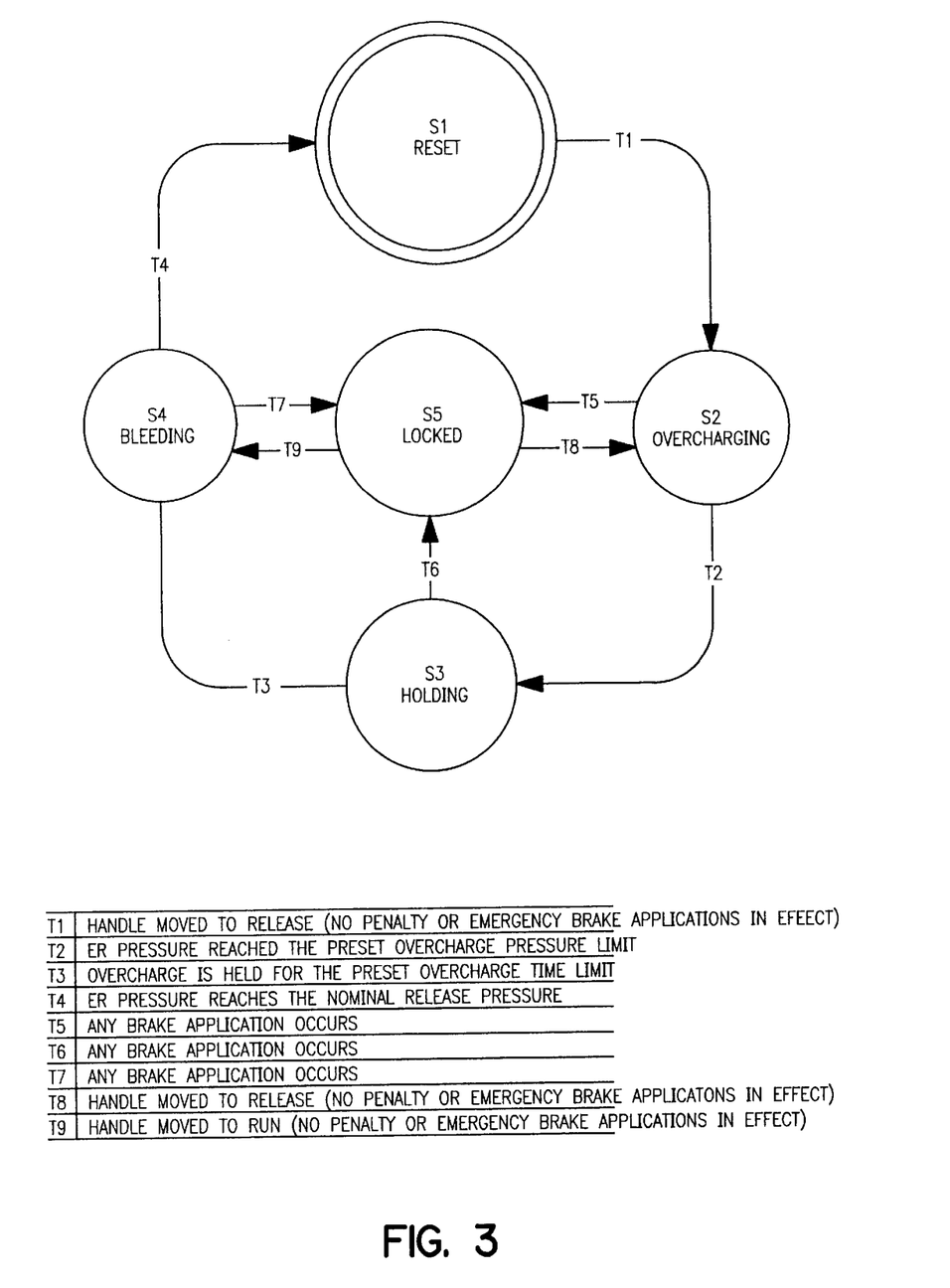
FIG. 3 is a flow chart state diagram of overcharge control incorporating the principles of the present invention.

The computer relay unit CRU will begin the overcharge, holding and bleeding cycle once initiated in response to a release brake control signal. This is illustrated by transitions T5, T6 and T7 from the overcharging state S2, holding state S3 and bleeding state S4 to the locked state S5. It will maintain this even upon receiving a run brake control signal after being initiated by a release brake control signal. Upon receipt of a service brake control signal, the computer relay unit CRU will terminate the charging, holding and bleeding cycle and initiate a brake pipe reduction in response to the service brake control signal. It will use the AW4ER to control the equalization reservoir pressure and consequently, the brake pipe pressure. The service brake reduction will be from the value of the brake pipe pressure at which the charging, holding and bleeding cycle was terminated.

After the service brake application and upon receipt of a run brake control signal, the bleeding cycle is reinstated to remove any overcharge from the service brake application and is shown as a transition T9. This is done at the bleeding rate which is a sufficiently slow rate that application of the brakes would not result. Following a service brake application, if a release brake control signal is received, a new overcharge cycle of charging, holding and bleeding would be initiated and is shown as transition T8.

It should also be noted that if a release brake control signal is received and maintained, the computer relay unit CRU will overcharge the brake pipe to a value greater than that preselected. Upon termination of the release brake control signal, the holding period and the bleeding would be initiated. The specific operation is described in the flow chart of FIG. 3.

The pneumatic control unit PCU also includes a brake cylinder equalization valve BCEV. It includes supply and exhaust electropneumatic valves connected to the main reservoir MR and lead-trail magnetic valve MVLT providing a pilot input to the 20 pipe relay valve 20R. The 20 pipe is the brake cylinder equalization pipe. The output from the 20 pipe relay valve 20ER is provided through the lead-trail pneumatic valve PVLT and filter F3 to the brake cylinder equalization pipe port BCEP. A 20 pipe test port TP20 and a 20 pipe transducer 22 provided at the output of the PVLT valve.

The main reservoir equalization pipe port MREP is connected through filter F4 as an input to equalization reservoir pneumatic interlock valve PVER1. A main reservoir equalization pipe transducer MRET is also provided to the output of filter F4. The output of the equalization reservoir pneumatic interlock PVERI is connected as a pilot input to the pneumatic break-in-two valve PVBIT. One of the inputs of the pneumatic break-in-two valve PVBIT is connected to an input to the distributor valve KE, and its output is connected to a brake cylinder double check valve DCVBC and equalization reservoir double check valve DCVER. The other input to DCVBC is from the main reservoir MR and the higher of the two outputs is provided as the pilot input to the equalization reservoir pneumatic interlock valve PVER1.

The other input to the brake cylinder double check valve DCVBC is the output of the lead-trail pneumatic valve PVLT. The higher of its two inputs is provided as an input to the 16 pipe default magnetic valve MV16T. The other input to the 16 pipe default magnetic valve MV16T is from the 16 reservoir. The main reservoir MR provides the pilot signal for the two pneumatic valves under the control of the electropneumatic valve. The output of the 16 pipe default magnetic valve MV16T is provided as the pilot signal to the brake cylinder relay valve who's input is in the main reservoir MR and its output is to the brake cylinder port BC.

A 16 test point TP16 is provided at the output of the 16 pipe default magnetic valve MV16T and a brake cylinder test point TPBC is provided at the output of the brake cylinder relay valve. A brake cylinder transducer is connected to brake cylinder transducer port BCT, as is a brake pipe transducer BPT connected to the brake pipe transducer port BPT.

An emergency magnetic valve MVEM provides a pilot input to the emergency pilot air valve PVEM. Its output is connected to the brake pipe port BP. In an emergency condition, these valves connect the brake pipe to the exhaust to create an emergency condition in the brake pipe. Also provided between the main reservoir and the brake pipe BP are cutoff cock COC, regulating valve REGV, a choke and a check valve. This provides an interconnection of the main reservoir and the brake pipe for dead engine operation.

As previously discussed, the two series orifices 01 and 02 with the bypass valves which bypasses the smaller of the orifices 02 in a release position, provide the ability to have a release and a running position of charging the brake pipe. Although an electropneumatic valve providing a pilot to a pneumatic valve is shown, other valve structures may be used to selectively cut out the smaller orifice 02 during a release mode and maintaining the two orifices in series during a running mode. Also, these combinations may be used in other pneumatic control units.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An electropneumatic brake controller comprising:
   a main reservoir;
   a pneumatic brake pipe relay valve;
   first and second restrictions connected in series with the main reservoir, the brake pipe relay valve and the train brake pipe, and the second restriction being smaller than the first restriction in flow crossectonal size; and
   a first electropneumatic valve responsive to an electric release signal to cut out the second restriction.

2. A controller according to claim 1, including a manifold to which is mounted the brake pipe relay valve, the first and second restrictions and the first electropneumatic valve.

3. A controller according to claim 2, wherein at least one of the restrictions are replaceable.

4. A controller according to claim 1, wherein the controller has a release mode and a running mode; and the first electropneumatic valve and the brake pipe relay valve connect the brake pipe to the first restriction in the release mode and to the first and second restrictions in the running mode.

5. A controller according to claim 1, wherein the combination of the series connected first and second restrictions has a flow rate allowing a break-in-two emergency brake application.

6. A controller according to claim 1, wherein the first electropneumatic valve has a first input connected to exhaust and a second input connected to a source of pressure, and including a pilot valve having a first input and an output connecting the pilot valve in parallel to the second restriction and a pilot input connected to the output of the first electropneumatic valve.

7. A controller according to claim 6, wherein the first electropneumatic valve is biased to connect its output to exhaust when not activated and the pilot valve is biased to disconnect it's first input and output when not activated.

8. A controller according to claim 1, including an equalization reservoir and a second electropneumatic valve controlling pressure in the equalization reservoir; and the brake pipe relay valve is responsive to the pressure difference between brake pipe and equalization reservoir.

9. A controller according to claim 8, wherein the second electropneumatic valve charges the equalization reservoir from the main reservoir during release.

10. A controller according to claim 1, wherein the first and second restrictions are connected between the main reservoir and the brake pipe relay valve.

11. A controller according to claim 1, including an operator control providing electrical brake control signals and a control unit for generating the electric release signal in response to brake control signals from the operator control.

12. A controller according to claim 11, wherein the control unit, in response to a release brake control signal, generates the release signal until the brake pipe is charged to a predetermined over charge value.

13. A controller according to claim 12, wherein the control unit continues to generate the release signal to charge to the over charge value in response to release or run brake control signals.

14. A controller according to claim 13, wherein the control unit terminates the charging and begins a brake pipe reduction in response to service brake control signals.

15. A controller according to claim 11, wherein the control unit maintains the over charge value for a fixed period of time.

16. A controller according to claim 15, wherein the control unit, after the fixed period of time, bleeds the brake pipe at a bleeding rate to a release pressure value.

17. A controller according to claim 16, including an equalization reservoir and a second electropneumatic valve controlling pressure in the equalization reservoir; the brake pipe relay valve is responsive to the pressure difference between brake pipe and equalization reservoir; and the control unit controls the second electropneumatic valve to determine the pressure value of the brake pipe and the bleeding rate.

18. An electropneumatic brake controller comprising:
    a main reservoir;
    a pneumatic brake pipe relay valve;
    an electropneumatic restriction connected in series with the main reservoir, the brake pipe relay relay and the brake pipe having a first and second flow rate, the second flow rate is smaller than the first flow rate; and
    a control unit controlling the restriction in responsive to brake control signals.

19. A controller according to claim 18, wherein the control unit controls the restriction to the first flow rate for a release brake control signal and to the second flow rate for a run brake control signal.

20. A controller according to claim 19, wherein the control unit, in response to the release brake control signal, controls the restriction to maintain the first flow rate until the brake pipe is charged to a predetermined over charge value.

21. A controller according to claim 20, wherein the control unit continues to controls the restriction to maintain the first flow rate to charge to the over charge value once initiated.

22. A controller according to claim 21, wherein the control unit terminates the charging and begins a brake pipe reduction in response to service brake control signals.

23. A controller according to claim 22, wherein the control unit controls the brake pipe reduction in response to service brake control signals from the brake pipe pressure at charging termination.

24. A controller according to claim 20, wherein the control unit maintains the over charge value for a fixed period of time.

25. A controller according to claim 24, wherein the control unit, after the fixed period of time, bleeds the brake pipe at a bleeding rate to a release pressure value.

26. A controller according to claim 25, including an equalization reservoir and a second electropneumatic valve controlling pressure in the equalization reservoir; the brake pipe relay valve is responsive to the pressure difference between brake pipe and equalization reservoir; and the control unit controls the second electropneumatic valve to determine the pressure value of the brake pipe and the bleeding rate.

27. A controller according to claim 25, wherein the bleeding rate is substantially smaller than the first flow rate.

* * * * *

UNITED STATES PATENT AND TRADEMARK OFFICE
CERTIFICATE OF CORRECTION

PATENT NO. : 6,126,245 Page 1 of 1
DATED : October 3, 2000
INVENTOR(S) : Wayne H. Barber, John W. Laduc, Steven R. Newton, Ronald O. Newton It is certified that error appears in the above-identified patent and that said Letters Patent is hereby corrected as shown below:

Claim 18,
Line 5, change "relay" second occurrence to -- valve --

Signed and Sealed this

Twelfth Day of March, 2002

Attest:

Attesting Officer

JAMES E. ROGAN
Director of the United States Patent and Trademark Office